(12) United States Patent
Nakao et al.

(10) Patent No.: US 12,395,108 B2
(45) Date of Patent: Aug. 19, 2025

(54) MOTOR DRIVE DEVICE AND ELECTRIC VEHICLE SYSTEM

(71) Applicant: Hitachi Astemo, Ltd., Hitachinaka (JP)

(72) Inventors: Noriya Nakao, Tokyo (JP); Shun Taniguchi, Tokyo (JP); Toshiyuki Ajima, Tokyo (JP); Keiji Kadota, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 147 days.

(21) Appl. No.: 18/277,117

(22) PCT Filed: Aug. 31, 2021

(86) PCT No.: PCT/JP2021/032026
§ 371 (c)(1),
(2) Date: Aug. 14, 2023

(87) PCT Pub. No.: WO2022/180895
PCT Pub. Date: Sep. 1, 2022

(65) Prior Publication Data
US 2024/0128908 A1    Apr. 18, 2024

(30) Foreign Application Priority Data
Feb. 24, 2021    (JP) .................................. 2021-028016

(51) Int. Cl.
*H02P 21/00*    (2016.01)
*B60K 1/00*    (2006.01)
(Continued)

(52) U.S. Cl.
CPC ............... *H02P 21/22* (2016.02); *B60K 1/00* (2013.01); *B60L 15/20* (2013.01); *B60L 2240/423* (2013.01); *B60L 2240/427* (2013.01)

(58) Field of Classification Search
CPC ........ H02P 21/22; H02P 21/20; H02P 25/022; H02P 21/24; H02P 6/28; H02P 21/0089; H02P 21/10
See application file for complete search history.

(56) References Cited

U.S. PATENT DOCUMENTS

2011/0231066 A1    9/2011    Ohno et al.
2014/0346983 A1    11/2014   Kato

FOREIGN PATENT DOCUMENTS

JP    2006-141095 A    6/2006
JP    2011-194914 A    10/2011
(Continued)

OTHER PUBLICATIONS

International Search Report (PCT/ISA/210) issued in PCT Application No. PCT/JP2021/032026 dated Oct. 26, 2021 with English translation (4 pages).
(Continued)

*Primary Examiner* — Karen Masih
(74) *Attorney, Agent, or Firm* — Crowell & Moring LLP

(57) ABSTRACT

A motor drive device controls torque generated by a motor, based on a d-axis current and a q-axis current. The motor drive device includes a d-axis current instruction generating unit that calculates a first d-axis current instruction, a current instruction correcting unit that generates a positive correction quantity that is added to the first d-axis current instruction when a voltage across terminals of the motor is equal to or larger than a given value, and a voltage feedback control unit that generates a negative correction quantity that is added to the first d-axis current instruction to prevent the voltage across the terminals of the motor from exceeding a given maximum output voltage. The motor drive device controls the torque, based on a second d-axis current instruction created by adding the positive correction quantity and (Continued)

the negative correction quantity to the first d-axis current instruction and on a q-axis current instruction.

12 Claims, 8 Drawing Sheets

(51) Int. Cl.
  *B60L 15/20* (2006.01)
  *H02P 21/22* (2016.01)

(56) References Cited

FOREIGN PATENT DOCUMENTS

| | | | |
|---|---|---|---|
| JP | 2013-90545 A | | 5/2013 |
| JP | 2020048251 A | * | 3/2020 |

OTHER PUBLICATIONS

Japanese-language Written Opinion (PCT/ISA/237) issued in PCT Application No. PCT/JP2021/032026 dated Oct. 26, 2021 (3 pages).

* cited by examiner

MOTOR DRIVE DEVICE AND ELECTRIC VEHICLE SYSTEM

TECHNICAL FIELD

The present invention relates to a motor drive device and an electric vehicle system using the motor drive device.

BACKGROUND ART

To drive a three-phase synchronous motor (which will hereinafter be referred to as a "motor" in some cases), an inverter that converts a DC power supply into an AC voltage is used in general. It is necessary, in this case, that control be carried out so that a voltage across the motor terminals, the voltage increasing with the rotating speed of the three-phase synchronous motor, does not exceed the maximum output voltage of the inverter. This control is called weak field control, by which the voltage across the motor terminals is adjusted through a flow of a current (hereinafter, "weak field current") that cancels the interlinkage magnetic flux of the three-phase synchronous motor.

As weak field control, a method using feedback control based on a deviation between the maximum output voltage of the inverter and a voltage applied to the motor (hereinafter, "voltage feedback control") is known. For example, Patent Literature 1 discloses a technique of carrying out weak field control by correcting a current instruction set according to an operation condition, such as a torque instruction, with a current instruction created by voltage feedback control. This voltage feedback control involves a limiter because the control corrects the current instruction only in the direction in which the absolute value of a weak field current increases. Because of the presence of the limiter, the voltage feedback control can be activated only when the voltage across the motor terminals exceeds the maximum output voltage of the inverter.

CITATION LIST

Patent Literature

PTL 1: JP 2006-141095 A

SUMMARY OF INVENTION

Technical Problem

According to conventional weak field control, when a current instruction set according to an operating condition, such as a torque instruction, is insufficient, voltage feedback control is carried out in such a way as to compensate an insufficient portion of the current instruction. However, when the current instruction becomes excessively large and the voltage across the motor terminals drops below the maximum output voltage of the inverter, the above limiter works to prevent activation of the voltage feedback control and a surplus current flows as a consequence, which is a problem.

An object of the present invention, which has been conceived to solve the above problem, is to avoid generation of a surplus current flow under weak field control to prevent a drop in motor driving efficiency.

Solution to Problem

A motor drive device according to the present invention is a device that controls torque generated by a motor, based on a d-axis current and a q-axis current, to drive the motor. The motor drive device includes: a d-axis current instruction generating unit that calculates a first d-axis current instruction; a current instruction correcting unit that generates a positive correction quantity that is added to the first d-axis current instruction when a voltage across terminals of the motor is equal to or larger than a given value; and a voltage feedback control unit that generates a negative correction quantity that is added to the first d-axis current instruction to prevent the voltage across the terminals of the motor from exceeding a given maximum output voltage. The motor drive device controls the torque, based on a second d-axis current instruction created by adding the positive correction quantity and the negative correction quantity to the first d-axis current instruction and on a q-axis current instruction.

An electric vehicle system according to the present invention includes a motor drive device; the motor driven by the motor drive device; an axle coupled to the motor; and wheels fixed to the axle.

Advantageous Effects of Invention

According to the present invention, generation of a surplus current flow under weak field control can be avoided and therefore a drop in motor driving efficiency can be prevented.

DESCRIPTION OF EMBODIMENTS

Figure 1:
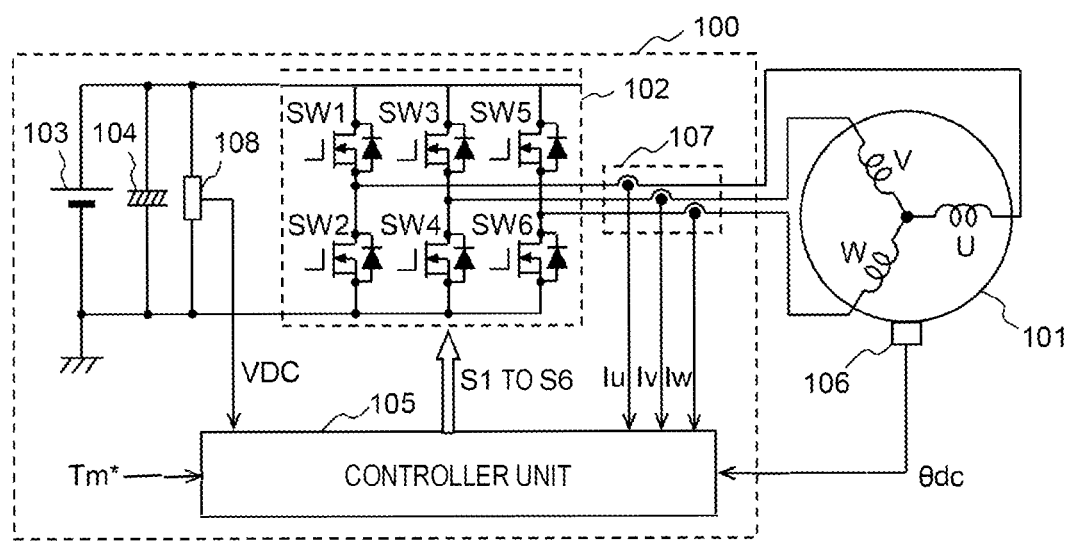
FIG. 1 is a configuration diagram of a motor drive device according to a first embodiment.

A motor drive device according to the present invention will hereinafter be described with reference to the drawings. The same elements in the drawings are denoted by the same reference sings, and redundant description will be omitted.

First Embodiment

A first embodiment of the motor drive device according to the present invention will be described with reference to FIGS. 1 to 5.

FIG. 1 is a configuration diagram of a motor drive device 100 according to the first embodiment. The motor drive device 100 according to this embodiment drives a three-phase synchronous motor 101 by controlling torque generated by the three-phase synchronous motor 101 (hereinafter, "motor 101") through vector control based on a d-axis current and a q-axis current. The motor drive device 100 includes a power conversion circuit 102 that generates an AC voltage for driving the motor 101, from a DC power supply, a DC power supply 103 that supplies a DC voltage VDC to the power conversion circuit 102, a smoothing capacitor 104 that smooths the DC voltage VDC, and a controller unit 105 that controls the power conversion circuit 102.

To the motor 101, a rotor position sensor 106 that detects the position of a rotor is connected. Between the motor 101 and the power conversion circuit 102, a current sensor 107 is disposed, which detects currents of individual phases flowing through the motor 101. A voltage sensor 108 that detects the DC voltage VDC of the DC power supply 103 is connected in parallel with the DC power supply 103. A three-phase permanent magnet synchronous motor or the like is used as the motor 101, and a resolver or the like is used as the rotor position sensor 106. A lithium ion secondary battery or the like is used as the DC power supply 103.

In the motor drive device 100, a torque command Tm*, a U-phase current Iu, a V-phase current Iv, and a W-phase current Iw that are detected by the current sensor 107, the DC voltage VDC detected by the voltage sensor 108, and a rotor position θdc detected by the rotor position sensor 106 are inputted to the controller unit 105. Based on these sensor signals, the controller unit 105 outputs switching signals S1 to S6 for operating the switching elements SW1 to SW6 of the power conversion circuit 102.

Figure 2:
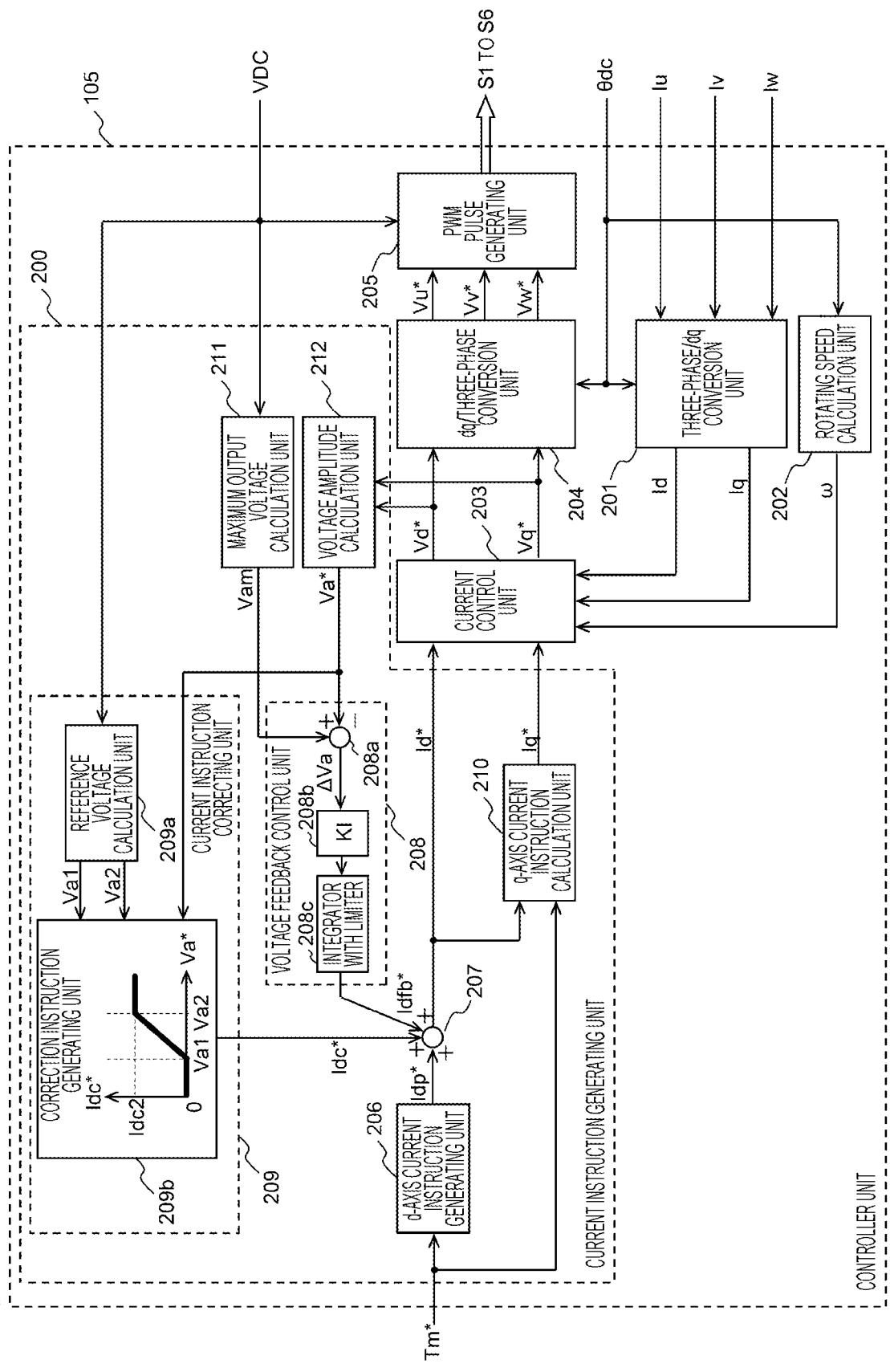
FIG. 2 is a functional block diagram of a controller unit according to the first embodiment.

FIG. 2 is a functional block diagram of the controller unit 105 according to the first embodiment. The controller unit 105 is basically configured to carry out vector control, and includes a current instruction generating unit 200, a current control unit 203, a dq/three-phase conversion unit 204, a three-phase/dq conversion unit 201, a rotating speed calculation unit 202, and a PWM pulse generating unit 205 that each serve as a functional block. The controller unit 105 is composed of, for example, a microcomputer, and this microcomputer executes given programs to implement these functional blocks. Alternatively, some or all of these functional blocks may be provided as hardware circuits, such as a logic IC or an FPGA.

Based on the incoming torque instruction Tm* from a high-order control device (not illustrated), the current instruction generating unit 200 generates a d-axis current instruction Id* (which will hereinafter be referred to as "post-correction d-axis current instruction" in some cases) and a q-axis current instruction Iq* to allow execution of maximum torque/current control and weak field control on the motor 101. Maximum torque/current control refers to control by which motor torque for the same current is maximized through current instruction adjustment.

The three-phase/dq conversion unit 201 converts the U-phase current Iu, the V-phase current Iv, and the W-phase current Iw, which are detected by the current sensor 107, into a d-axis detection current Id and a q-axis detection current Iq, based on the rotor position θdc detected by the rotor position sensor 106.

The rotating speed calculation unit 202 derives a rotational angular velocity ω, based on the rotor position θdc detected by rotor position sensor 106.

The current control unit 203 generates a d-axis voltage instruction Vd* and a q-axis voltage instruction Vq*, based on the d-axis current instruction Id* and q-axis current instruction Iq* from the current instruction generating unit 200, the d-axis detection current Id and q-axis detection current Iq from the three-phase/dq conversion unit 201, and the rotational angular velocity ω from the rotating speed calculation unit 202, and carries out control so that a d-axis current and a q-axis current follow instruction values for the d-axis current and the q-axis current, respectively.

The dq/three-phase conversion unit 204 converts the d-axis voltage instruction Vd* and q-axis voltage instruction Vq* from the current control unit 203, into a U-phase voltage instruction Vu*, a V-phase voltage instruction Vv*, and a W-phase voltage instruction Vw*, based on the rotor position θdc detected by the rotor position sensor 106.

The PWM pulse generating unit 205 outputs the switching signals S1 to S6, based on the DC voltage VDC detected by voltage sensor 108 and on the U-phase voltage instruction Vu*, V-phase voltage instruction Vv*, and W-phase voltage instruction Vw* from the dq/three-phase converter 204.

What is described above is an outline of the configuration of the controller unit 105. The current instruction generating unit 200 will then be described in detail.

The current instruction generating unit 200 includes a d-axis current instruction generating unit 206, a q-axis current instruction calculation unit 210, a maximum output voltage calculation unit 211, a voltage amplitude calculation unit 212, a voltage feedback control unit 208, a current instruction correcting unit 209, and an adder 207.

The d-axis current instruction generating unit 206 calculates and generates a pre-correction d-axis current instruction Idp*, based on the torque instruction Tm*. The d-axis current instruction generating unit 206 can be provided as, for example, a lookup table in which the torque command Tm* and the pre-correction d-axis current instruction Idp* are associated with each other. The d-axis current instruction generating unit 206 may be configured to generate the pre-correction d-axis current instruction Idp*, based on the torque instruction Tm* and on the rotational angular velocity ω as well.

To the pre-correction d-axis current instruction Idp* from the d-axis current instruction generating unit 206, a negative correction quantity Idfb* from the voltage feedback control unit 208 and a positive correction quantity Idc* from the current instruction correcting unit 209 are added at the adder 207, where the post-correction d-axis current instruction Id* is generated as a consequence. Operations of the voltage feedback control unit 208 and the current instruction correcting unit 209 will be described later.

The q-axis current instruction calculation unit 210 generates the q-axis current instruction Iq*, based on the torque instruction Tm* and the d-axis current instruction Id* from the adder 207. The q-axis current instruction calculation unit 210 can be provided as, for example, a lookup table in which the torque instruction Tm*, the d-axis current instruction Id*, and the q-axis current instruction Iq* are associated with each other.

The maximum output voltage calculation unit 211 calculates a maximum output voltage Vam the power conversion circuit 102 can generate, based on the DC voltage VDC detected by voltage sensor 108. In a case where a sinusoidal modulation method (modulation method according to which the ratio of an output voltage amplitude of the power conversion circuit 102 to DC voltage VDC is 0.866 ($\approx\sqrt{3}/2$) at maximum in terms of line voltage) is applied, the maximum output voltage Vam is derived by the maximum output voltage calculation unit 211 using the following equation.

$$Vam = VDC/2 \qquad (1)$$

The voltage amplitude calculation unit 212 derives a voltage amplitude Va*, based on the d-axis voltage instruction Vd* and q-axis voltage instruction Vq* from the current control unit 203, using the following equation.

$$Va^* = \sqrt{(Vd^{*2} + Vq^{*2})} \qquad (2)$$

In the example of FIG. 2, the voltage amplitude calculation unit 212 calculates the voltage amplitude Va* from the d-axis voltage instruction Vd* and the q-axis voltage instruction Vq*, the voltage amplitude Va* being based on the d-axis voltage instruction Vd* and the q-axis voltage instruction Vq*. The voltage amplitude, however, may be calculated in a different manner such that an AC voltage outputted from the power conversion circuit 102 to the motor 101 is measured to determine the d-axis voltage Vd and the q-axis voltage Vq from the measured AC voltage and that the voltage amplitude Va is calculated based on a voltage detection value. In other words, the voltage amplitude calculation unit 212 can calculate the voltage amplitude Va (Va*) outputted from the motor drive device 100, based on the d-axis voltage Vd (d-axis voltage instruction Vd*) that is adjusted in such a way as to cause the d-axis current Id to follow the d-axis current instruction Id* and the q-axis voltage Vq (q-axis voltage instruction Vq*) that is adjusted in such a way as to cause the q-axis current Iq to follow the q-axis current instruction Iq*. The motor drive device 100 applies the voltage amplitude Va (Va*) to the motor 101, as a voltage-across-terminals of the motor 101.

The voltage feedback control unit 208 includes a subtractor 208a, an integration control gain 208b, and a limiter-attached integrator 208c. The voltage feedback control unit 208 multiplies a difference ($\Delta Va = Vam - Va^*$) between the maximum output voltage Vam from the maximum output voltage calculation unit 211 and the voltage amplitude Va* from the voltage amplitude calculation unit 212 by an integral control gain KI and integrates the multiplication result by the limiter-attached integrator 208c, thereby outputting the correction quantity Idfb* added to the pre-correction d-axis current instruction Idp*.

When the result of integration of a value given by multiplying the difference $\Delta Va$ by the integral control gain KI is an integrated vale larger than 0, the limiter-attached integrator 208c carries out a limiter process of reducing the integrated value to 0. Because of this limiter process, the correction quantity Idfb* outputted from the voltage feedback control unit 208 always becomes a negative value.

The limiter process by the limiter-attached integrator 208c is necessary to stop the voltage feedback control unit 208 from operating under an operation condition requiring no weak field control. If the limiter process is not executed, the voltage feedback control unit 208 outputs the correction quantity Idfb*, based on the difference $\Delta Va$, even when the voltage amplitude Va* is smaller than the maximum output voltage Vam and therefore voltage adjustment by weak field control is unnecessary (in this case, the correction quantity Idfb* is a positive value). As a result, at execution of maximum torque/current control, an operating point deviates from an optimum condition, under which a torque/current ratio is maximized, because of the correction quantity Idfb* added. This leads to a drop in operation efficiency.

According to this embodiment, the voltage feedback control unit 208 outputs "0" as the correction quantity Idfb* through the limiter process executed by the limiter-attached integrator 208c when the result of integration of the value given by multiplying the difference $\Delta Va$ by the integral control gain KI is a positive value. This prevents a case where the operating point deviates from the optimum condition when voltage adjustment by weak field control is unnecessary.

FIGS. 3A to 4C show examples of operations in which the motor drive device 100 according to this embodiment shifts to a weak field control mode as the rotating speed increases. In FIGS. 3A to 4C, FIGS. 3A and 4A indicate time-sequence changes in the rotational angular velocity ω, FIGS. 3B and 4B indicate time-sequence changes in the d-axis current instruction Id*, and FIGS. 4A and 4C indicate time-sequence changes in the voltage amplitude Va*. It should be noted that in these graphs, the positive correction quantity Idc* from the current instruction correcting unit 209 is always set 0.

In the operation examples of FIGS. 3A to 4C, the rotational angular velocity ω increases at a constant gradient up to a point of time t12, after which the rotational angular velocity ω becomes a constant velocity and therefore the same motor rotating speed is maintained.

Figure 3A:
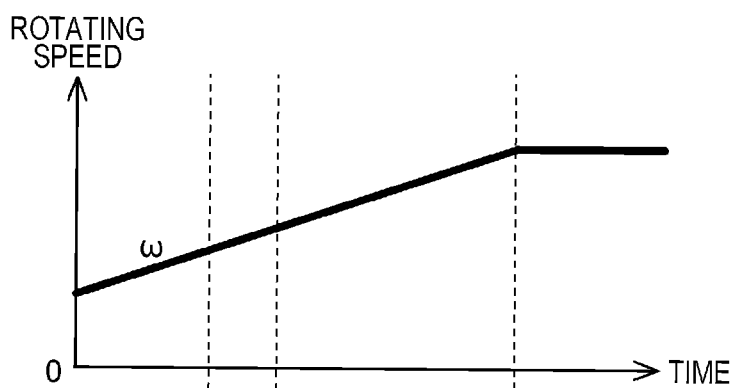
FIGS. 3A to 3C depict examples of operation of the motor drive device according to the first embodiment.
Figure 3B:
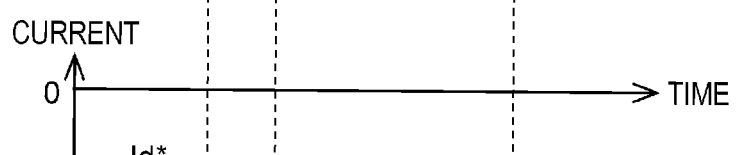
Figure 3C:
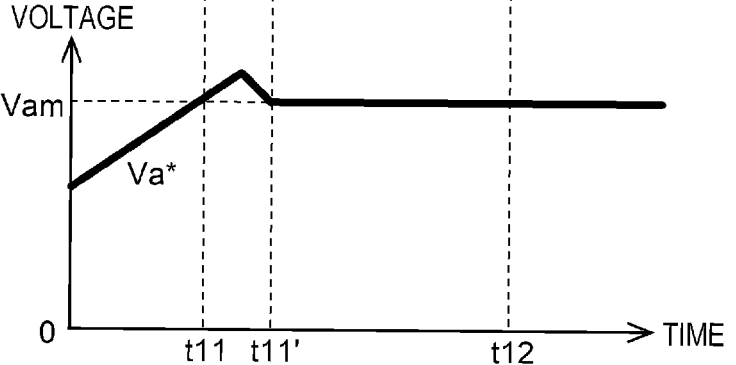

FIGS. 3A to 3C show an operation example in which the value of the pre-correction d-axis current instruction Idp* is set such that the pre-correction d-axis current instruction Idp*, which is outputted from the d-axis current instruction generating unit 206, and an optimum current Idopt satisfy a relationship |Idp*|<|Idopt| at t=0. In this case, a weak field current is insufficient in the pre-correction d-axis current instruction Idp*. The optimum current Idopt refers to a current value at which, after t11, Va*=Vam holds as a relationship between the voltage amplitude Va* and the maximum output voltage Vam. For convenience, however, the value of Idopt is set constant in the period between 0 to t11. Idp* is a constant value.

In the example of FIGS. 3A to 3C, because the weak field current is insufficient in the pre-correction d-axis current instruction Idp* as mentioned above, the voltage feedback control unit 208 generates the negative correction quantity Idfb* based on the difference $\Delta Va$ between the maximum output voltage Vam and the voltage amplitude Va* in a period following time t11 in which Vam<Va* holds.

At the adder 207, the negative correction quantity Idfb* generated by the voltage feedback control unit 208 is added to the pre-correction d-axis current instruction Idp*. As a result, the value of the post-correction d-axis current instruction Id* (Id*=Idp*+Idfb*) gradually approaches the optimum current Idopt. Then, the value of the d-axis current instruction Id* reaches the optimum current Idopt at time t11', at which Va*=Vam holds. The voltage feedback control unit 208 then adjusts the negative correction quantity Idfb* in such a way as to maintain this relationship Va*=Vam. Hence the motor drive device 100 operates so that the relationship Id*=Idopt is maintained to hold the relationship Va*=Vam.

As described above, in the motor drive device 100 of this embodiment, when the weak field current is insufficient, the voltage feedback control unit 208 operates to compensate an insufficient portion of the weak field current. This keeps the d-axis current instruction Id* equal to the optimum current Idopt, thus preventing the voltage amplitude Va* from exceeding the maximum output voltage Vam.

Figure 4A:
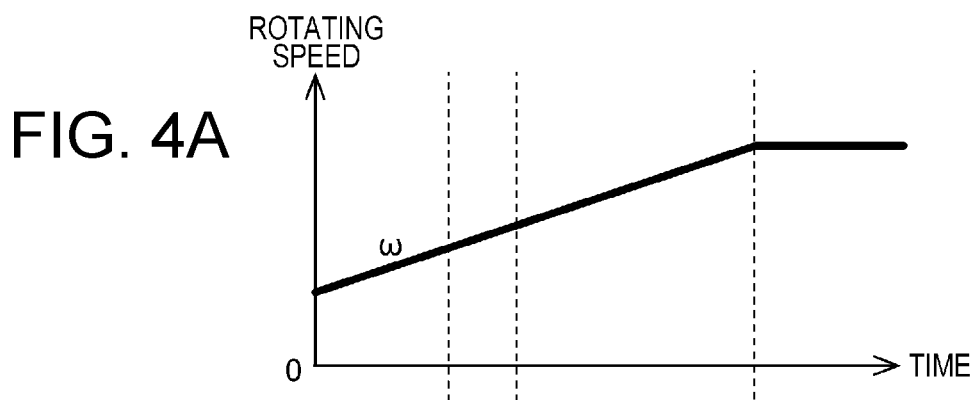
FIGS. 4A to 4C depict examples of operation of the motor drive device according to the first embodiment.
Figure 4B:
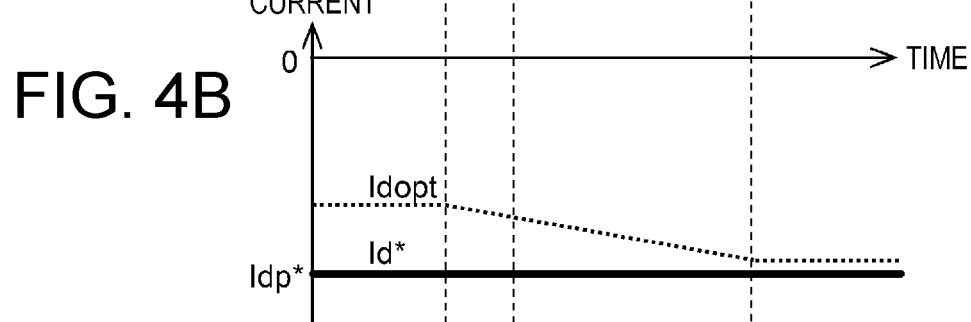
Figure 4C:
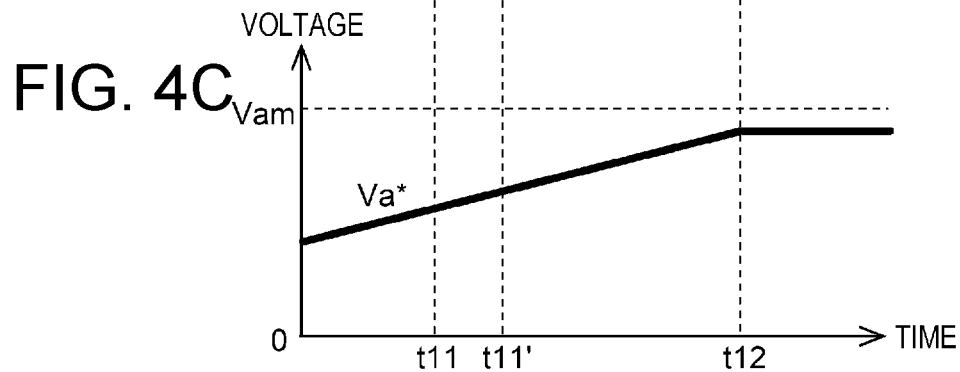

FIGS. 4A to 4C show an operation example in which the value of the pre-correction d-axis current instruction Idp* is set such that the pre-correction d-axis current instruction Idp*, which is outputted from the d-axis current instruction generating unit 206, and the optimum current Idopt satisfy a relationship |Idopt|<|Idp*| at t=0. In this case, the weak field current is surplus in the pre-correction d-axis current instruction Idp*. Other conditions are the same as those in FIGS. 3A to 3C.

In the example of FIGS. 4A to 4C, because the weak field current is surplus in the pre-correction d-axis current instruction Idp* as mentioned above, Va*<Vam holds at time t11.

At this time, in the voltage feedback control unit 208, the limiter-attached integrator 208c obtains a positive integrated value based on the difference $\Delta Va$. However, as a result of the limiter process by the limiter-attached integrator 208c, the correction quantity Idfb* finally outputted from the voltage feedback control unit 208 turns out to be 0. As a result, the pre-correction d-axis current instruction Idp* is not corrected, which leaves a surplus current flowing.

In this manner, because of the limiter process by the limiter-attached integrator 208c, the voltage feedback control unit 208 operates only at execution of weak field control. However, according to this configuration, the voltage feedback control unit 208 does not operate when the weak field current becomes surplus, which poses a problem of a drop in operation efficiency.

To deal with this problem with the voltage feedback control unit 208, the motor drive device 100 according to this embodiment is provided with the current instruction correcting unit 209 shown in FIG. 2.

The current instruction correcting unit 209 includes a reference voltage calculation unit 209a and a correction instruction generating unit 209b. The voltage feedback control unit 208 outputs the negative correction quantity Idfb*, whereas the current instruction correcting unit 209 generates and outputs a positive correction quantity Idc*.

Based on the DC voltage VDC of the DC power supply 103 detected by the voltage sensor 108, the reference voltage calculation unit 209a calculates and sets a first reference voltage Va1 and a second reference voltage Va2. Respective values of Va1 and Va2 are determined such that with respect to the maximum output voltage Vam given by the above equation (1), for example, a relationship Va1<Va2≤Vam is satisfied.

The correction instruction generating unit 209b generates the positive correction quantity Idc*, based on a size relationship between the voltage amplitude Va* from the voltage amplitude calculation unit 212 and the first reference voltage Va1 and second reference voltage Va2 from the reference voltage calculation unit 209a. The positive correction quantity Idc* is generated and outputted, using any one of the following equations (3) to (5), in accordance with the size relationship between Va* and Va1, Va2.

(a) In the case of 0≤Va*<Va1

$$Idc^* = 0 \quad (3)$$

(b) In the case of Va1≤Va*<Va2

$$Idc^* = (Idc2/(Va2-Va1)) \cdot (Va^* - Va1) \quad (4)$$

(c) In the case of Va2≤Va*

$$Idc^* = Idc2 \quad (5)$$

The value of Idc2 in the equations (4) and (5) is set in advance by the correction instruction generating unit 209b, based on the pre-correction d-axis current instruction Idp* and the above-described optimum current Idopt. Specifically, the correction instruction generating unit 209b sets the value of Idc2 such that the absolute value of a current value given by adding the positive correction quantity Idc* calculated by equation (5) to the pre-correction d-axis current instruction Idp* becomes smaller than the absolute value of the optimum current Idopt and therefore the current value is intentionally made insufficient as the weak field current, as described with reference to FIGS. 3A to 3C. The value of Idc2 may be changed according to the value of the pre-correction d-axis current instruction Idc* or of the DC voltage VDC.

At the adder 207, the positive correction quantity Idc* generated by the correction instruction generating unit 209b is added to the pre-correction d-axis current instruction Idp*, to which the negative correction quantity Idfb* outputted from the voltage feedback control unit 208 is added, too. In this process, by using Idc2 set in the above manner, the correction instruction generating unit 209b generates the positive correction quantity Idc* in such a way as to intentionally make the value of Idp*+Idc* insufficient as the weak field current. The voltage feedback control unit 208 operates to compensate an insufficient portion of the weak field current, thus generating the negative correction quantity Idfb*. Hence the situation where the surplus current flows, the situation being indicated in FIGS. 4A to 4C, can be avoided.

However, if the positive correction quantity Idc* is added to the pre-correction d-axis current instruction Idp* in an operation mode different from the weak field control mode, the motor operating point deviates from the optimum condition, which leads to a drop in operation efficiency and the like. To prevent this, as indicated by the above equation (3), the correction instruction generating unit 209b sets the positive correction quantity Idc* to 0 when the voltage amplitude Va* is less than the first reference voltage Va1. This allows the current instruction correcting unit 209 to generate the positive correction quantity Idc* right before a shift to weak field control.

As a method of determining timing of operation of the current instruction correcting unit 209, for example, a method to let the current instruction correcting unit 209 generate the positive correction quantity Idc* at a point of time of the voltage amplitude Va* reaching the maximum output voltage Vam may be considered. This method, however, raises a possibility that a steep change in the d-axis current instruction Id* creates a torque shock.

To prevent such a case, the motor drive device 100 according to this embodiment carries out control so that the positive correction quantity Idc* is gradually generated slightly before the voltage amplitude Va* reaches the maximum output voltage Vam. Specifically, the first reference voltage Va1 is set smaller than the maximum output voltage Vam as the second reference voltage Va2 is set equal to the maximum output voltage Vam.

Figure 5A:
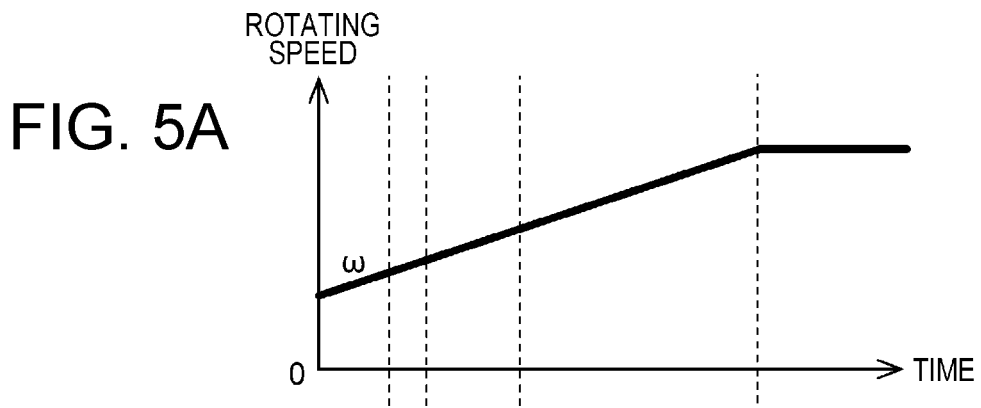
FIGS. 5A to 5C depict examples of operation of the motor drive device according to the first embodiment.
Figure 5B:
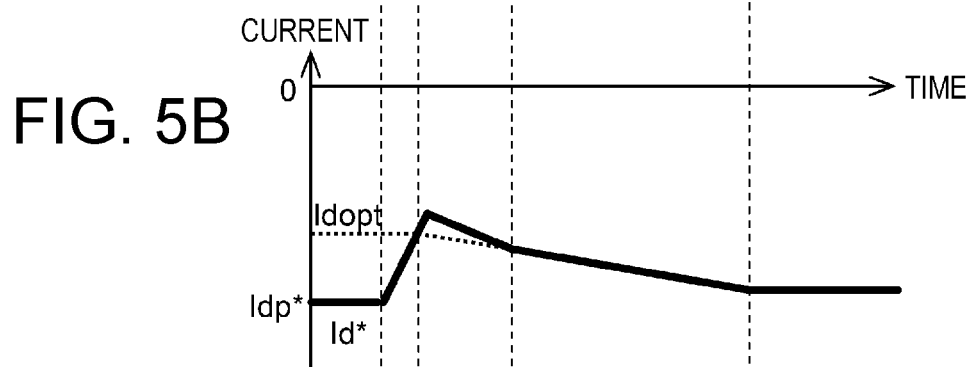
Figure 5C:
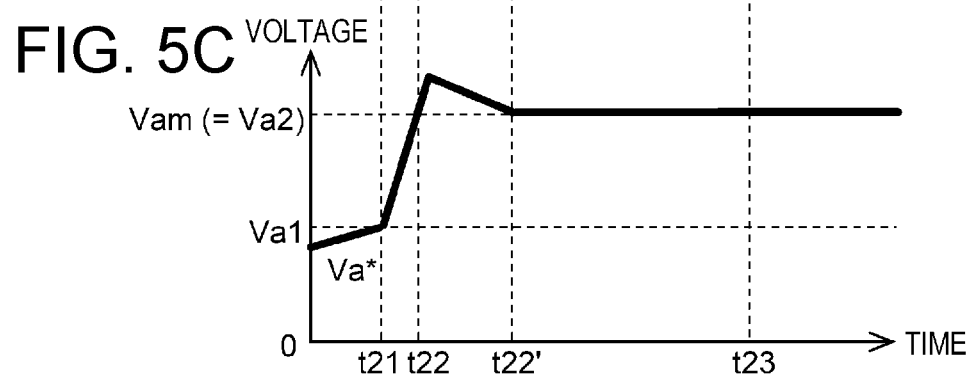

Similar to the operation examples of FIGS. 3A to 4C, FIGS. 5A to 5C show an example of an operation in which the motor drive device 100 according to this embodiment shifts to the weak field control mode as the rotating speed increases. FIGS. 5A to 5C show an operation example in which the current instruction correcting unit 209 sets the positive correction quantity Idc* according to the equations (3) to (5).

In the operation example of FIGS. 5A to 5C, the rotational angular velocity ω increases at a constant gradient up to a point of time t23, after which the rotational angular velocity ω becomes a constant velocity and therefore the same motor rotating speed is maintained.

Similar to the operation example of FIGS. 4A to 4C, FIGS. 5A to 5C show an operation example in which the value of the pre-correction d-axis current instruction Idp* is set such that the pre-correction d-axis current instruction Idp*, which is outputted from the d-axis current instruction generating unit 206, and the optimum current Idopt satisfy the relationship |Idopt|<|Idp*| at t=0. For convenience, however, the value of Idopt is set constant in the period between 0 to t22. Idp* is a constant value. In this case, as mentioned above, the weak field current is surplus in the pre-correction d-axis current instruction Idp*.

In the operation examples of FIGS. 5A to 5C, when the voltage amplitude Va* reaches the first reference voltage Va1 at time t21, the current instruction correcting unit 209 starts generating the positive correction quantity Idc* according to equation (4), and this positive correction quantity Idc* is added to the pre-correction d-axis current instruction Idp*, which corrects the d-axis current instruction Id* in such a way as to bring it closer to the optimum current Idopt. Then, the voltage amplitude Va* becomes larger than the maximum output voltage Vam (second reference voltage Va2) and a relationship |Idp*+Idc*|<|Idopt| is satisfied at time t22, at which, as in the case of FIGS. 3A to 3C, the voltage feedback control unit 208 generates the negative correction quantity Idfb* based on the difference ΔVa between the maximum output voltage Vam and the voltage amplitude Va*. At this time, the current instruction correcting unit 209 makes the positive correction quantity Idc* constant according to equation (5). The absolute value of the positive correction quantity Idc* at this point of time is larger than the absolute value of the negative correction quantity Idfb* generated by the voltage feedback control unit 208.

The negative correction quantity Idfb* generated by the voltage feedback control unit 208 is added to the pre-correction d-axis current instruction Idp* at the adder 207, where the positive correction quantity Idc* is added to the pre-correction d-axis current instruction Idp* as well. As a result, the value of the post-correction d-axis current instruction Id* (Id*=Idp*+Idc*+Idfb*) gradually approaches the optimum current Idopt. Then, the value of the d-axis current instruction Id* reaches the optimum current Idopt and Va*=Vam holds at time t22', at which the voltage feedback control unit 208 adjusts the negative correction quantity Idfb* so as to maintain the relationship Va*=Vam. Hence the motor drive device 100 operates so that the relationship Id*=Idopt is maintained to hold Va*=Vam, as does in the case of FIGS. 3A to 3C.

In this manner, according to the motor drive device 100 of this embodiment, even when the weak field current is surplus, the voltage feedback control unit 208 is activated by the operation of the current instruction correcting unit 209 to avoid generation of the surplus current flow.

The above-described first embodiment of the present invention offers the following effects.

(1) The motor drive device 100 is the device that controls the torque generated by the motor 101, based on the d-axis current and the q-axis current, to drive the motor 101. The motor drive device 100 includes the d-axis current instruction generating unit 206 that calculates the pre-correction d-axis current instruction Idp*, the current instruction correcting unit 209 that generates the positive correction quantity Idc* that is added to the pre-correction d-axis current instruction Idp* when the voltage amplitudes Va and Va*, which are the voltages across the terminals of the motor 101, are equal to or larger than the given reference voltage Va1, and the voltage feedback control unit 208 that generates the negative correction quantity Idfb* that is added to the pre-correction d-axis current instruction Idp* so that the voltage amplitudes Va and Va* do not exceed the given maximum output voltage Vam. The motor drive device 100 controls the torque of the motor 101, based on the post-correction d-axis current instruction Id* given by adding the positive correction quantity Idc* and the negative correction quantity Idfb* to the pre-correction d-axis current instruction Idp* and on the q-axis current instruction Iq*. According to this configuration, as described with reference to FIGS. 5A to 5C, generation of the surplus current flow under weak field control can be avoided and therefore a drop in motor driving efficiency can be prevented.

(2) The voltage feedback control unit 208 continuously generates the negative correction quantity Idfb* after the voltage amplitudes Va and Va* reach the maximum output voltage Vam. According to this configuration, the d-axis current instruction Id* can be kept equal to the optimum current Idopt to prevent the voltage amplitude Va* from exceeding the maximum output voltage Vam.

(3) The motor drive device 100 further includes the voltage amplitude calculation unit 212. The voltage amplitude calculation unit 212 calculates the voltage amplitude Va (Va*) outputted from the motor drive device 100, based on the d-axis voltage Vd (d-axis voltage instruction Vd*) adjusted such that the d-axis current follows the post-correction d-axis current instruction Id* and on the q-axis voltage Vq (q-axis voltage instruction Vq*) adjusted such that the q-axis current follows the q-axis current instruction Iq*. The current instruction correcting unit 209 sets the reference voltages Va1 and Va2, based on the voltage VDC of the DC power supply that is supplied to the motor drive device 100, and generates the positive correction quantity Idc*, based on the size relationship between the voltage amplitude Va (Va*) and the reference voltages Va1 and Va2. According to this configuration, the positive correction quantity Idc* added to the pre-correction d-axis current instruction Idp* can be generated as a proper value.

(4) The current instruction correcting unit 209 makes the positive correction quantity Idc* constant when the voltage amplitude Va (Va*) is equal to or larger than the reference voltage Va2. At this point of time, the positive correction quantity Idc* is larger than the negative correction quantity Idfb*. According to this configuration, the d-axis current instruction Id* can be kept equal to the optimum current Idopt in a stable manner.

(5) The reference voltages Va1 and Va2 are equal to or smaller than the maximum output voltage Vam. According to this configuration, the positive correction quantity Idc* can be generated as a proper value so that the post-correction d-axis current instruction Id* is intentionally made insufficient as the weak field current.

Second Embodiment

A second embodiment of the motor drive device according to the present invention will be described with reference to FIG. 6.

Figure 6:
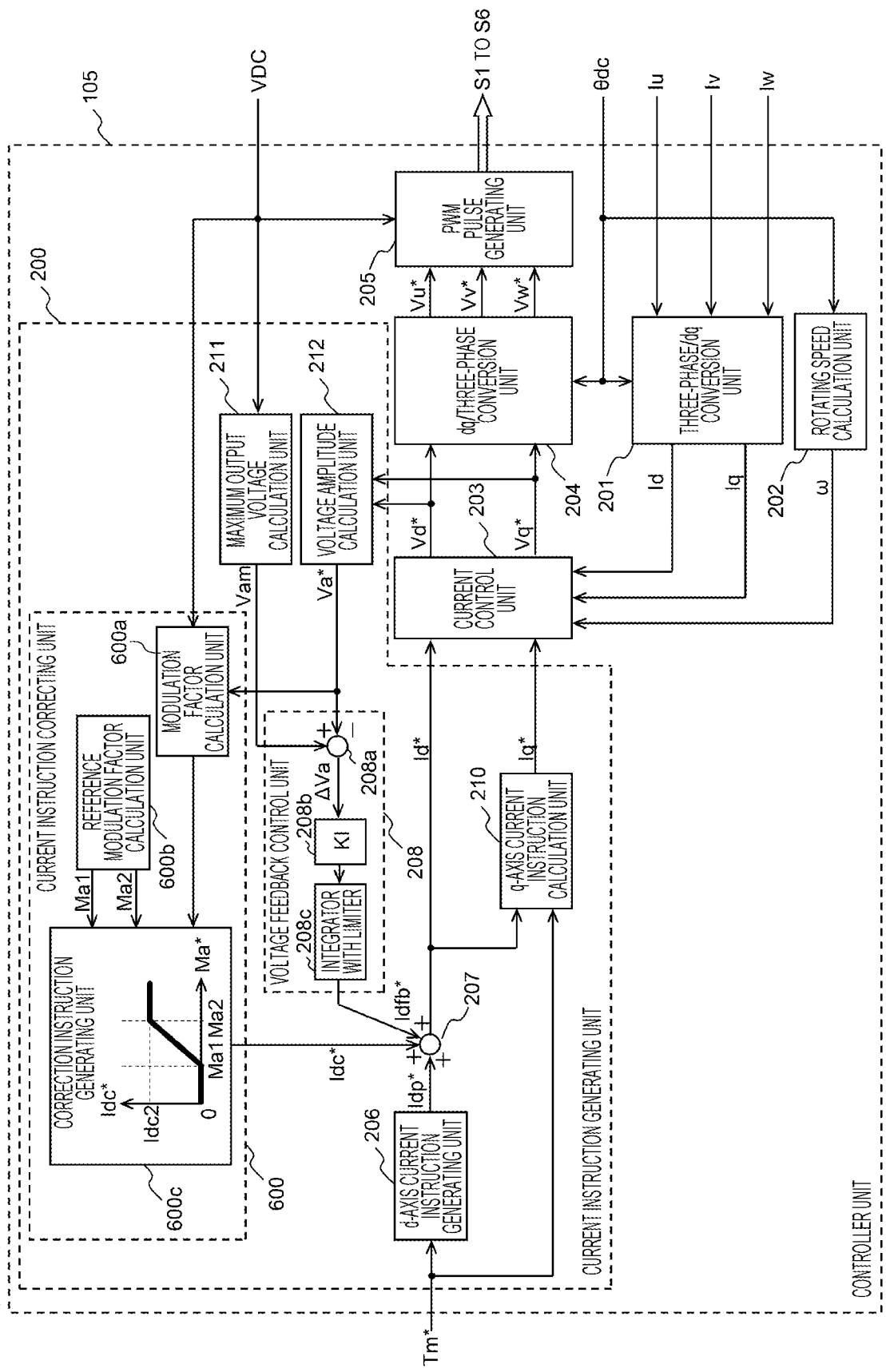
FIG. 6 is a functional block diagram of a controller unit according to a second embodiment.

FIG. 6 is a functional block diagram of the controller unit 105 included in the motor drive device 100 according to the second embodiment. The controller unit 105 according to the second embodiment includes a current instruction correcting unit 600 in place of the current instruction correcting unit 209 in the current instruction generating unit 200, the current instruction correcting unit 209 being described in the first embodiment and shown in FIG. 2. The current instruction correcting unit 600 is different from the current instruction correcting unit 209 of the first embodiment in that the current instruction correcting unit 600 generates a positive correction quantity Idc*, based on a modulation factor Ma*. Constituent elements other than the controller unit 105 in the motor drive device 100 and constituent elements other than the current instruction correcting unit 600 in the controller unit 105 are the same as those in the first embodiment. The same constituent elements as those of the first embodiment will be omitted in further description.

The current instruction correcting unit 600 includes a modulation factor calculation unit 600a, a reference modulation factor calculation unit 600b, and a correction instruction generating unit 600c.

The modulation factor calculation unit 600a derives the modulation factor Ma*, based on the DC voltage VDC of the DC power supply 103 detected by voltage sensor 108 and the voltage amplitude Va* from the voltage amplitude calculation unit 212, using the following equation.

$$Ma^* = Va^*/(VDC/2) \quad (6)$$

When, as described above, the voltage amplitude calculation unit 212 calculates the voltage amplitude Va based on a voltage detection value, the modulation factor calculation unit 600a may derive a modulation factor Ma based on the voltage detection value by using the above equation (6) with Va* replaced with Va. In other words, the modulation factor calculation unit 600a can calculate the modulation factor Ma (Ma*) of the motor drive device 100, based on the DC voltage VDC of the DC power supply 103 supplied to the motor drive device 100 and on the voltage amplitude Va (Va*) calculated by the voltage amplitude calculation unit 212.

The reference modulation factor calculation unit 600b calculates and sets a first reference modulation factor Ma1 and a second reference modulation factor Ma2. For example, the values of Ma1 and Ma2 are determined in such a way as to satisfy a relationship Ma1<Ma≤1.

The correction instruction generating unit 600c generates the positive correction quantity Idc*, based on a size relationship between the modulation factor Ma* from the modulation factor calculation unit 600a and the first reference modulation factor Ma1 and second reference modulation factor Ma2 from the reference modulation factor calculation unit 600b. In this process, the positive correction quantity Idc* is generated and outputted, using any one of the following equations (7) to (9), according to the size relationship between Ma* and Ma1 and Ma2.

(a) In the case of 0≤Ma*<Ma1

$$Idc^* = 0 \quad (7)$$

(b) In the case of Ma1≤Ma*<Ma2

$$Idc^* = (Idc2/(Ma2-Ma1)) \cdot (Ma^*-Ma1) \quad (8)$$

(c) In the case of Ma2≤Ma*

$$Idc^* = Idc2 \quad (9)$$

The value of Idc2 in the equations (8) and (9) is set in advance by the correction instruction generating unit 600c, based on the pre-correction d-axis current instruction Idp* and the above-described optimum current Idopt. Specifically, in the same manner as in the first embodiment, the correction instruction generating unit 600c sets the value of Idc2 such that the absolute value of a current value given by adding the positive correction quantity Idc* calculated by equation (9) to the pre-correction d-axis current instruction Idp* becomes smaller than the absolute value of the optimum current Idopt and therefore the current value is intentionally made insufficient as the weak field current. The value of Idc2 may be changed according to the value of the pre-correction d-axis current instruction Idc* or of the DC voltage VDC.

At the adder 207, the positive correction quantity Idc* generated by the correction instruction generating unit 600c is added to the pre-correction d-axis current instruction Idp*, to which the negative correction quantity Idfb* outputted from the voltage feedback control unit 208 is added, too. In the same manner as in the first embodiment, therefore, the voltage feedback control unit 208 operates in such a way as to compensate an insufficient portion of the weak field current, thus generating the negative correction quantity Idfb*. Hence the situation where the surplus current flows can be avoided.

The motor drive device 100 according to this embodiment carries out control so that the positive correction quantity Idc* is gradually generated slightly before the voltage amplitude Va* reaches the maximum output voltage Vam, in the same manner as the motor drive device 100 of the first embodiment does. Specifically, when sinusoidal modulation is applied, the first reference modulation factor Ma1 is set smaller than 1 as the second reference modulation factor Ma2 is set equal to 1.

According to the motor drive device 100 of this embodiment, even when the weak field current is surplus, the voltage feedback control unit 208 is activated by the operation of the current instruction correcting unit 600 to avoid generation of the surplus current flow. This operation principle is the same as that of the first embodiment except that the current instruction correcting unit 600 operates based on the modulation factor Ma*.

The above-described second embodiment of the present invention offers the following effects (6) to (8), in addition to the effects (1) and (2) described in the first embodiment.

(6) The motor drive device 100 further includes the voltage amplitude calculation unit 212. The voltage amplitude calculation unit 212 calculates the voltage amplitude Va (Va*) outputted from the motor drive device 100, based on the d-axis voltage Vd (d-axis voltage instruction Vd*) adjusted such that the d-axis current follows the post-correction d-axis current instruction Id* and on the q-axis voltage Vq (q-axis voltage instruction Vq*) adjusted such that the q-axis current follows the q-axis current instruction Iq*. The current instruction correcting unit 600 calculates the modulation factor Ma (Ma*), based on the voltage VDC of the DC power supply supplied to the motor drive device 100 and on the voltage amplitude Va(Va*), and calculates the reference modulation factors Ma1 and Ma2 as well, and generates the positive correction quantity Idc*, based on the size relationship between the modulation factor Ma (Ma*) and the reference modulation factors Ma1 and Ma2. According to this configuration, the positive correction quantity Idc* added to the pre-correction d-axis current instruction Idp* can be generated as a proper value.

(7) The current instruction correcting unit 209 makes the positive correction quantity Idc* constant when the modulation factor Ma (Ma*) is equal to or larger than the reference modulation factor Ma2. At this point of time, the absolute value of the positive correction quantity Idc* is larger than the absolute value of the negative correction quantity Idfb*. According to this configuration, the d-axis current instruction Id* can be kept equal to the optimum current Idopt in a stable manner.

(8) The reference modulation factors Ma1 and Ma2 are equal to or smaller than 1. According to this configuration, the positive correction quantity Idc* can be generated as a proper value so that the post-correction d-axis current instruction Id* is intentionally made insufficient as the weak field current.

Third Embodiment

A third embodiment of the motor drive device according to the present invention will be described with reference to FIG. 7.

Figure 7:
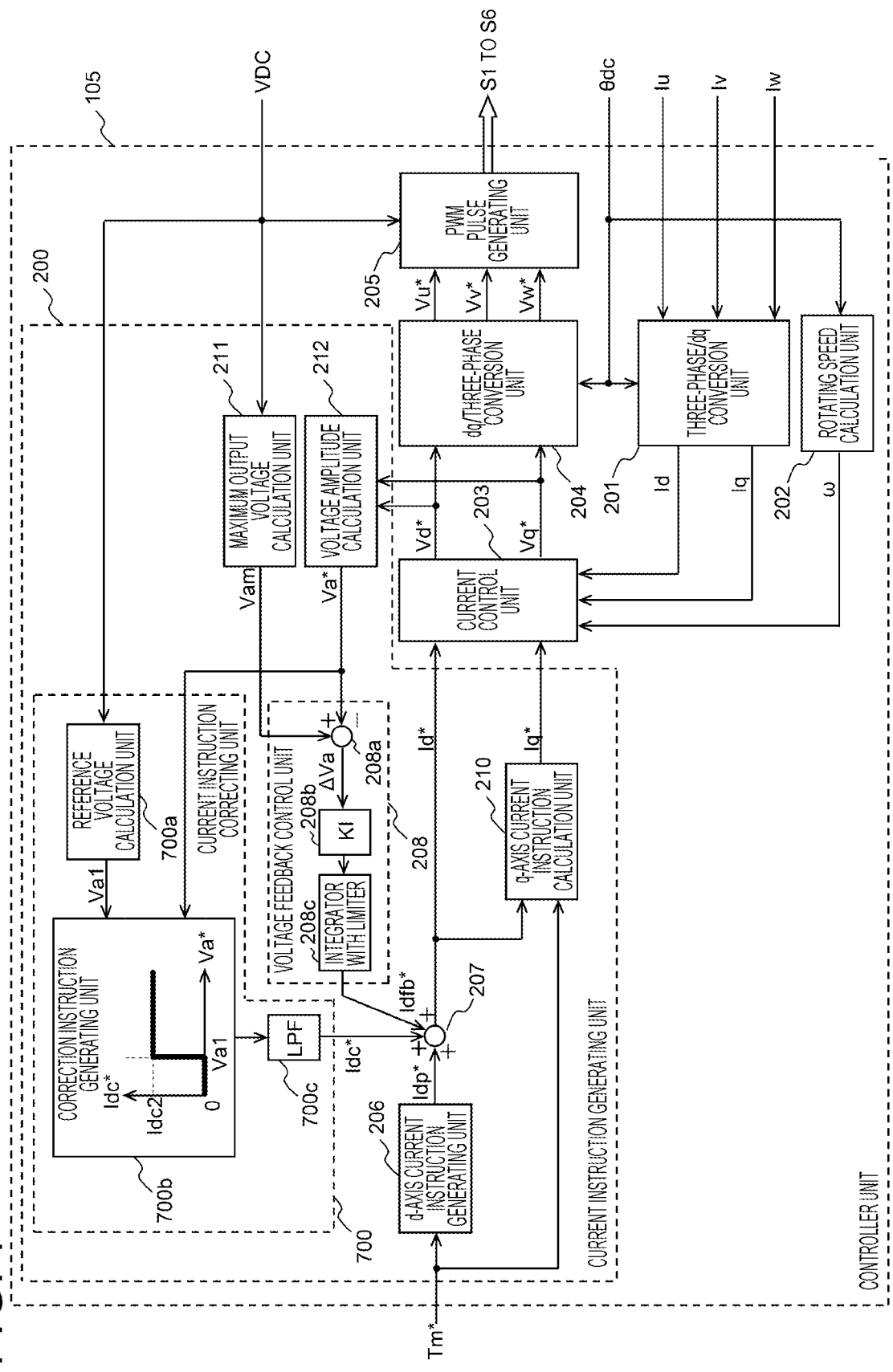
FIG. 7 is a functional block diagram of a controller unit according to a third embodiment.

FIG. 7 is a functional block diagram of the controller unit 105 included in the motor drive device 100 according to the third embodiment. The controller unit 105 according to the third embodiment includes a current instruction correcting unit 700 in place of the current instruction correcting unit 209 in the current instruction generating unit 200, the current instruction correcting unit 209 being described in the first embodiment and shown in FIG. 2. The current instruction correcting unit 700 is different from the current instruction correcting unit 209 of the first embodiment in that the current instruction correcting unit 700 generates the positive correction quantity Idc*, based on a single reference value, and further includes a low-pass filter (hereinafter, "LPF") process executed in a stage in front of the adder 207. Constituent elements other than the controller unit 105 in the motor drive device 100 and constituent elements other than the current instruction correcting unit 700 in the controller unit 105 are the same as those in the first and second embodiments. The same constituent elements as those of the first and second embodiments will be omitted in further description.

The current instruction correcting unit 700 includes a reference voltage calculation unit 700a, a correction instruction generating unit 700b, and an LPF 700c.

The reference voltage calculation unit 700a calculates and sets the first reference voltage Va1, based on the DC voltage VDC of the DC power supply 103 detected by the voltage sensor 108.

The correction instruction generating unit 700b generates the positive correction quantity Idc*, based on a size relationship between the voltage amplitude Va* from the voltage amplitude calculation unit 212 and the first reference voltage Va1 from the reference voltage calculation unit 700a. The positive correction quantity Idc* is generated and outputted, using one of the following equations (10) and (11), in accordance with the size relationship between Va* and Va1.

(a) In the case of 0≤Va*<Va1

$$Idc^* = 0 \tag{10}$$

(b) In the case of Va1≤Va*

$$Idc^* = Idc2 \tag{11}$$

The positive correction quantity Idc* generated by the correction instruction generating unit 700b is inputted with a given delay, to the adder 207 via the LPF 700c. At the adder 207, the positive correction quantity Idc*, together with the negative correction quantity Idfb* outputted from the voltage feedback control unit 208, is added to the pre-correction d-axis current instruction Idp*. In this manner, the positive correction quantity Idc* is gradually added with the delay caused by the LPF 700c, to the pre-correction d-axis current instruction Idp*. As a torque shock resulting from a sharp change in the d-axis current instruction Id* is avoided, therefore, the voltage feedback control unit 208 is caused to operate to generate the negative correction quantity Idfb* to compensate an insufficient portion of the weak field current so that the situation where the surplus current flows can be avoided.

The motor drive device 100 according to this embodiment carries out control so that the positive correction quantity Idc* is gradually generated slightly before the voltage amplitude Va* reaches the maximum output voltage Vam, in the same manner as the motor drive devices 100 of the first and second embodiments do. Specifically, the first reference voltage Va1 is set smaller than the maximum output voltage Vam as a time constant (delay) of the LPF 700c is set approximately equal to the response time constant of the current control unit 203.

According to the motor drive device 100 of this embodiment, even when the weak field current is surplus, the voltage feedback control unit 208 is activated by the operation of the current instruction correcting unit 700 to avoid generation of the surplus current flow. This operation principle is the same as that of the first embodiment except that the positive correction quantity Idc* is gradually added with the given delay caused by the LPF 700c, to the pre-correction d-axis current instruction Idp*.

The above-described third embodiment of the present invention offers the following effect (9), in addition to the effects (1) and (2) described in the first embodiment.

(9) The motor drive device 100 further includes the low-pass filter 700c, and adds the positive correction quantity Idc* with the given delay, to the pre-correction d-axis current instruction Idp* via the low-pass filter 700c to generate the post-correction d-axis current instruction Id*. According to this configuration, the situation where the surplus current flows can be avoided as a torque shock resulting from a sharp change in the d-axis current instruction Id* is avoided.

The third embodiment has been described above as the example in which the current instruction correcting unit 700 inputs the positive correction quantity Idc*, which the correction instruction generating unit 700b generates based on the size relationship with the first reference voltage Va1, to the adder 207 via the LPF 700c. However, the third embodiment may apply to a case where the positive correction quantity Idc* is generated based on the modulation factor, the case having been described in the second embodiment. Specifically, in the current instruction correcting unit 600 described in the second embodiment, the reference modulation factor calculation unit 600b sets the first reference modulation factor Ma1, and the correction instruction generating unit 700b generates the positive correction quantity Idc*, based on a size relationship between the first reference modulation factor Ma1 and the modulation factor Ma* calculated by the modulation factor calculation unit 600a. Inputting the positive correction quantity Idc* with a given delay, the positive correction quantity Idc* being generated in the above manner, to the adder 207 via the LPF 700c achieves the same effect.

Fourth Embodiment

Figure 8:
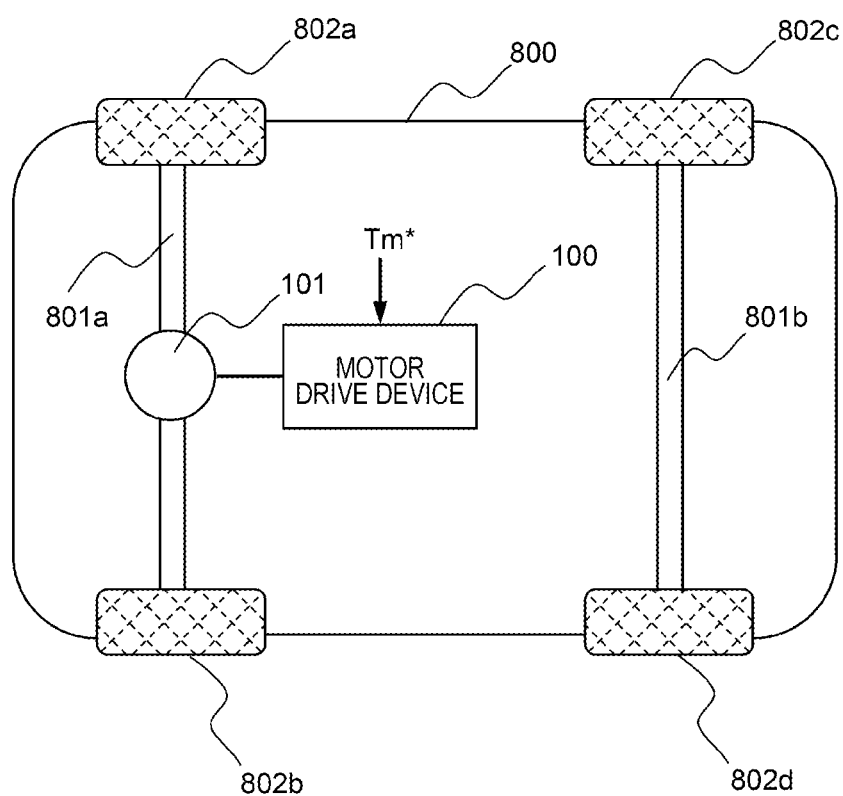
FIG. 8 is a configuration diagram of an electric vehicle system according to a fourth embodiment.

An electric vehicle system according to a fourth embodiment will be described with reference to FIG. 8. FIG. 8 is a configuration diagram of the electric vehicle system according to the fourth embodiment. An example of the electric vehicle system equipped with the motor drive device of any one of the first, second, and third embodiments will be described.

As shown in FIG. 8, an electric vehicle system 800 includes a pair of axles 801a and 801b pivotally supported on a vehicle body. A wheel 802a and a wheel 802b are fixed to both ends of one axle 801a, and a wheel 802c and a wheel 802d are fixed to both ends of the other axle 801b. To the one axle 801a, the three-phase synchronous motor 101 is connected, and its torque is transmitted to the wheels 802a and 802b via the axle 801a. The motor drive device 100 receives the torque instruction Tm* generated by a high-order system and drives the three-phase synchronous motor 101.

In the motor drive device 100 of the electric vehicle system 800, when weak field control is carried out during high-speed traveling, the current instruction correcting unit 209 (or the current instruction correcting unit 600 or the current instruction correcting unit 700) generates the positive correction quantity Idc* to correct the pre-correction d-axis current instruction Idp*. Thus, the current value given by adding the positive correction quantity Idc* to the pre-correction d-axis current instruction Idp* is intentionally made insufficient as the weak field current, and an insufficient portion of the weak field current is compensated with the negative correction quantity Idfb* generated by the voltage feedback control unit 208. As a result, the voltage feedback control unit 208 is caused to operate regardless of the set value of the pre-correction d-axis current instruction Idp*. The three-phase synchronous motor 101, therefore, can be driven with an optimum weak field current that is neither surplus nor insufficient. In other words, the situation indicated in FIGS. 4A to 4C can be avoided. Avoiding the surplus current flow at execution of weak field control in this manner prevents a drop in the operation efficiency of the three-phase synchronous motor, thus allowing an increase in the cruising distance of the electric vehicle system 800.

This embodiment has been described as an example in which the three-phase synchronous motor 101 is driven by the motor drive device 100 in systems related to electric vehicles, such as electric cars or hybrid cars. However, the same effect can be achieved when the motor drive device 100 is applied to other vehicles, such as railways, that travel on a driving force from the three-phase synchronous motor.

It should be noted that the present invention is not limited to the above embodiments but includes various modifications. For example, the above embodiments have been described in detail for easy understanding of the present invention, and are not necessarily limited to an embodiment including all constituent elements described above. Some constituent elements of a certain embodiment may be replaced with constituent elements of another embodiment, and a constituent element of another embodiment may be added to a constituent element of a certain embodiment. For example, the LPF 700c of the third embodiment may be added to the first embodiment and the second embodiment. In addition, some of constituent elements of each embodiment can be deleted therefrom or add to or replaced with constituent elements of another embodiment.

A group of control lines/information lines considered to be necessary for description are illustrated, and all control lines/information lines are not necessarily illustrated. It is safe to assume that, actually, almost the entire constituent elements are interconnected.

REFERENCE SIGNS LIST 100 motor drive device
101 three-phase synchronous motor (motor)
102 power conversion circuit
103 DC power supply
104 smoothing capacitor
105 controller unit
106 rotor position sensor
107 current sensor
108 voltage sensor
200 current instruction generating unit
201 three-phase/dq conversion unit
202 rotating speed calculation unit
203 current control unit
204 dq/three-phase conversion unit
205 PWM pulse generating unit
206 d-axis current instruction generating unit
207 adder
208 voltage feedback control unit
208a subtractor
208b integral control gain
208c limiter-attached integrator
209, 600, 700 current instruction correcting unit
209a, 700a reference voltage calculation unit
209b, 600c, 700b correction instruction generating unit
600a modulation factor calculation unit
600b reference modulation factor calculation unit
700c LPF210 q-axis current instruction calculation unit
211 maximum output voltage calculation unit
212 voltage amplitude calculation unit
800 electric vehicle system
801a, 801b axle
802a, 802b, 802c, 802d wheel

The invention claimed is:

1. A motor drive device that controls torque generated by a motor, based on a d-axis current and a q-axis current, to drive the motor, the motor drive device comprising:
   a d-axis current instruction generating unit that calculates a first d-axis current instruction;
   a current instruction correcting unit that generates a positive correction quantity that is added to the first d-axis current instruction when a voltage across terminals of the motor is equal to or larger than a given value; and
   a voltage feedback control unit that generates a negative correction quantity that is added to the first d-axis current instruction to prevent the voltage across the terminals of the motor from exceeding a given maximum output voltage, wherein
   the motor drive device controls the torque, based on a second d-axis current instruction created by adding the positive correction quantity and the negative correction quantity to the first d-axis current instruction and on a q-axis current instruction.

2. The motor drive device according to claim 1, wherein the voltage feedback control unit continuously generates the negative correction quantity after the voltage across the terminals of the motor reaches the maximum output voltage.

3. The motor drive device according to claim 1, further comprising a voltage amplitude calculation unit, wherein
   the voltage amplitude calculation unit calculates a voltage amplitude output from the motor drive device, based on a d-axis voltage adjusted such that the d-axis current follows the second d-axis current instruction and on a q-axis voltage adjusted such that the q-axis current follows the q-axis current instruction, and
   the current instruction correcting unit sets a single reference voltage or a plurality of reference voltages, based on a voltage of a DC power supply, the voltage being supplied to the motor drive device, and generates the positive correction quantity, based on a size relationship between the voltage amplitude and the reference voltage.

4. The motor drive device according to claim 3, wherein the current instruction correcting unit makes the positive correction quantity constant when the voltage amplitude is equal to or higher than the reference voltage.

5. The motor drive device according to claim 4, wherein when the positive correction quantity is made constant, the positive correction quantity is larger than the negative correction quantity.

6. The motor drive device according to claim 3, wherein the reference voltage is equal to or smaller than the maximum output voltage.

7. The motor drive device according to claim 1, further comprising a voltage amplitude calculation unit, wherein
   the voltage amplitude calculation unit calculates a voltage amplitude output from the motor drive device, based on a d-axis voltage adjusted such that the d-axis current follows the second d-axis current instruction and on a q-axis voltage adjusted such that the q-axis current follows the q-axis current instruction, and the current instruction correcting unit calculates a modulation factor, based on a voltage of a DC power supply, the voltage being supplied to the motor drive device, and on the voltage amplitude, sets a single reference modulation factor or a plurality of reference modulation factors, and generates the positive correction quantity, based on a size relationship between the modulation factor and the reference modulation factor.

8. The motor drive device according to claim 7, wherein the current instruction correcting unit makes the positive correction quantity constant when the modulation factor is equal to or larger than the reference modulation factor.

9. The motor drive device according to claim 8, wherein when the positive correction quantity is made constant, the positive correction quantity is larger than the negative correction quantity.

10. The motor drive device according to claim 7, wherein the reference modulation factor is equal to or smaller than 1.

11. The motor drive device according to claim 1, wherein the motor drive device further includes a low-pass filter, and adds the positive correction quantity with a given delay, to the first d-axis current instruction via the low-pass filter to generate the second d-axis current instruction.

12. An electric vehicle system comprising:
the motor drive device according to claim 1;
the motor driven by the motor drive device;
an axle coupled to the motor; and
a wheel fixed to the axle.

* * * * *